United States Patent [19]
Crask

[11] 3,924,251
[45] Dec. 2, 1975

[54] INPUT SIGNAL POWERED CONVERTER

[75] Inventor: Geoffrey J. Crask, Santa Ana, Calif.

[73] Assignee: Hydril Company, Los Angeles, Calif.

[22] Filed: Mar. 25, 1974

[21] Appl. No.: 454,370

[52] U.S. Cl. .............................. 340/190; 340/210
[51] Int. Cl.² ............................................ G08C 19/02
[58] Field of Search ............... 340/210, 189 M, 190

[56] References Cited
UNITED STATES PATENTS

| | | | |
|---|---|---|---|
| 3,223,889 | 12/1965 | Schweitzer | 340/210 |
| 3,461,384 | 8/1969 | Bayati | 340/190 |
| 3,596,262 | 7/1971 | Rollwitz | 340/190 |
| 3,682,160 | 8/1972 | Murata | 340/189 M |
| 3,699,389 | 10/1972 | Holsinger | 340/190 |
| 3,713,124 | 1/1973 | Durland | 340/189 M |
| 3,739,279 | 6/1973 | Hollis | 340/189 M |
| 3,836,855 | 9/1974 | Zaleski | 340/210 |

*Primary Examiner*—Thomas B. Habecker
*Attorney, Agent, or Firm*—William W. Haefliger

[57] ABSTRACT

Input signal powered converter apparatus comprises
a. a signal source to produce an analog output current,
b. converter means responsive to the source output current to produce an oscillatory output signal which varies as a linear function of the source output current,
c. a detector responsive to said oscillatory output signal, and
d. circuitry coupled between the source output and the converter means to electrically energize the converter means in response to current supplied by the source output.

4 Claims, 3 Drawing Figures

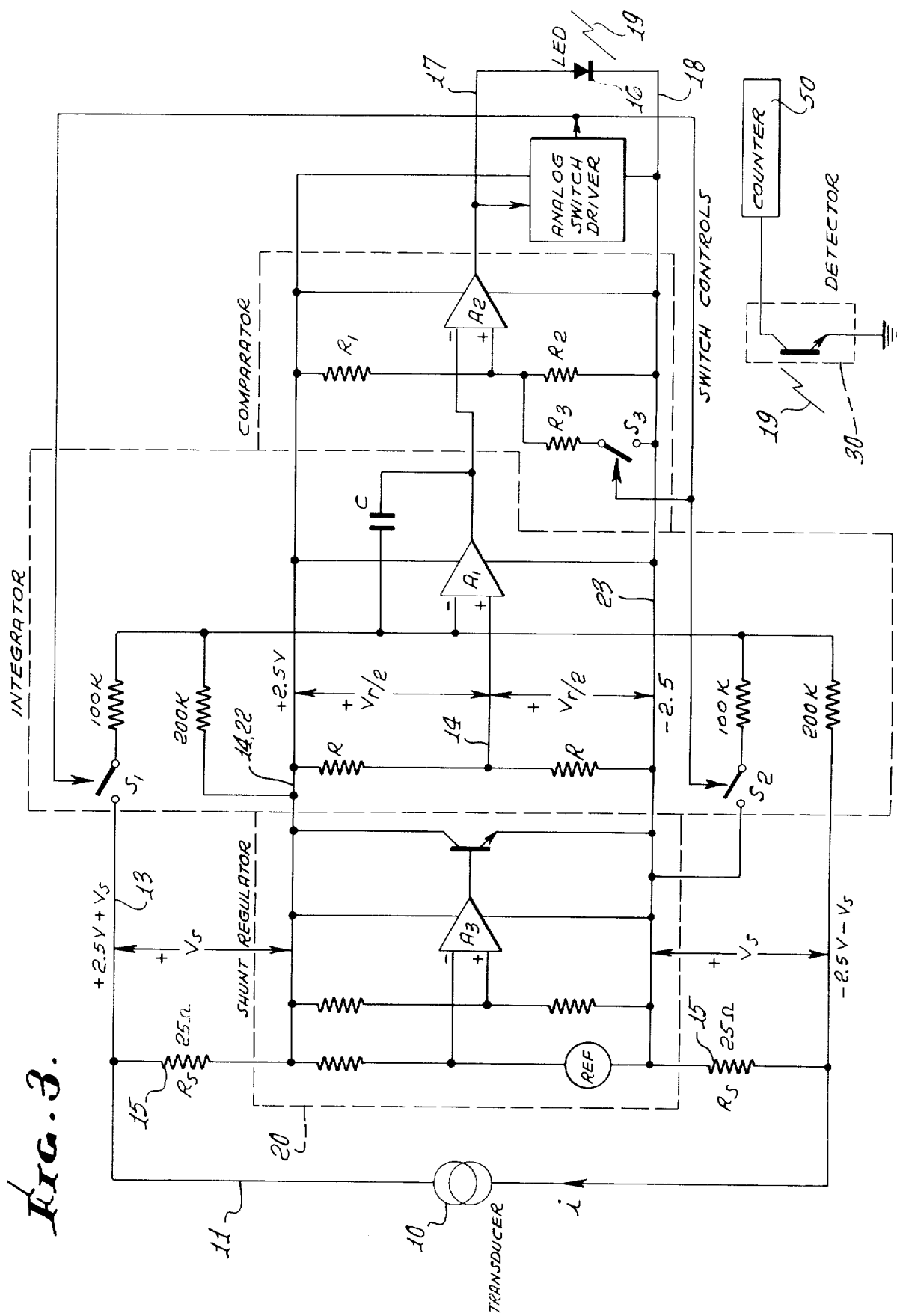

INPUT SIGNAL POWERED CONVERTER

BACKGROUND OF THE INVENTION

This invention relates generally to input signal powering of converters, and more particularly concerns the coupling of transducer current output signals to measuring equipment without introducing common-mode coupling impedances.

Many transducers, which convert physical signals such as temperatures, pressures, liquid levels, and so on, to proportional electrical signals for transmission to data display, recording, or computing facilities, are arranged to provide electrical current output signals to ensure that these signals are unaffected by the series resistance of the wires connecting the transducer current generator to its load device. Various standardized output current ranges, for example, 4-to-20mA DC, having become internationally recognized to minimize the necessary variety of input sensitivities of driven devices such as recorders.

With the development of automatic control equipment for industrial processes, it is frequently necessary to transmit many essentially independent transducer output current signals to a central location to provide sensor inputs to such control equipment. In order to minimize measurement errors caused by common-mode potentials between transducers and the central control equipment, it is essential to maximize the coupling impedances between the wires of each transducer and all other circuits at the central location.

Where transducer wires are routed over significant distances, local lightning strikes may induce substantial voltage surges in such wires, and special protection may be required for active semiconductor components within input devices connected to these wires.

SUMMARY OF THE INVENTION

This invention provides a major improvement in the achievable isolation between current transducer signals and all other circuits, and is particularly applicable where analog-to-digital signal format conversions are required. As will be seen, each transducer current signal is connected to an active "Converter" which provides an output signal, accurately proportional to the input current, of a suitable type to permit coupling to a local ground-referred matching detector via an arbitrarily high common-mode coupling impedance. In this environment, the active Converter device is powered exclusively by the transducer signal current. This eliminates the conventional power supply common-mode coupling impedance which has previously defined the limiting value of the signal isolation impedance.

The converter device may provide any suitable output signal, either digital or analog in nature, and may be arranged to provide any desired performance in terms of bandwidth, linearity, stability, isolation impedance, and common-mode isolation voltage. Prime objects of the invention may be summarized as follows:

1. To provide high isolation impedance between a transducer signal and all other circuits to eliminate errors due to common-mode potentials;
2. To provide high isolation voltage capability to eliminate damage to associated equipment due to high voltage transients induced in the transducer signal leads due, for example, to lightning-induced surges; and
3. To eliminate the necessity to provide high-isolation power supplies for each active input channel, and thus maximize performance at minimal cost. These and other objects and advantages of the invention, as well as the details of illustrative embodiments, will be more fully understood from the following description and drawings, in which:

DRAWING DESCRIPTION

FIG. 1 is a block diagram;
FIG. 2 is a block diagram; and
FIG. 3 is a circuit diagram.

DETAILED DESCRIPTION

Figure 1:
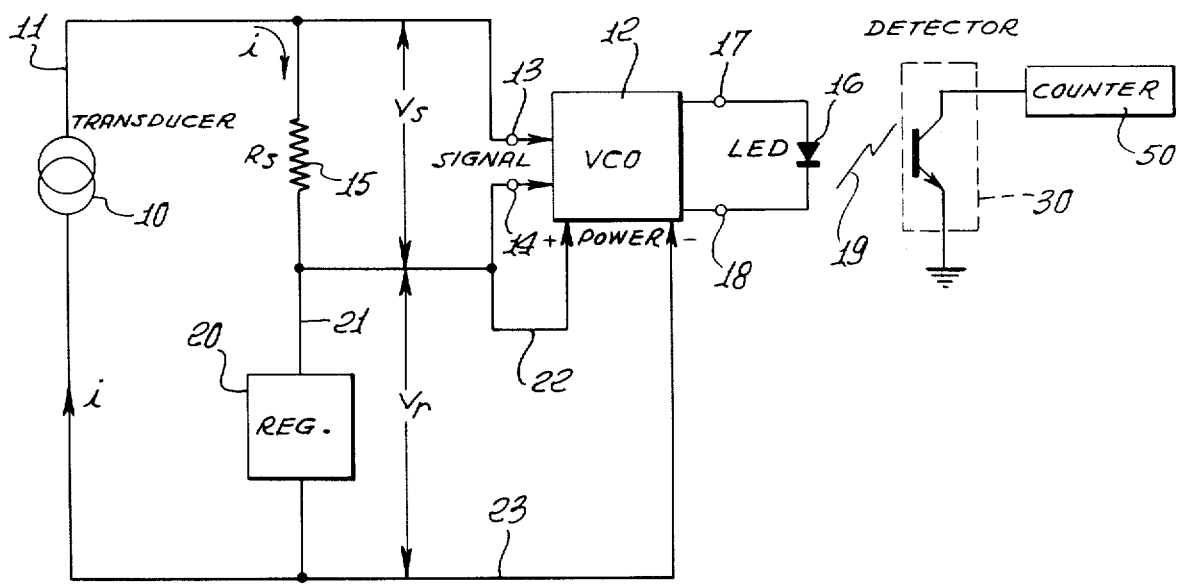

In accordance with the invention, the converter apparatus includes a signal source, one example of which comprises transducer 10 in FIG. 1, to produce an analog output at 11. Merely as illustrative, the transducer may comprise a pressure or temperature sensor that produces current $i$ proportional to the sensed pressure or temperature. Converter means is provided to be responsive to the transducer output to produce an oscialting output signal which varies as a function of the transducer output; and in FIG. 1 the converter includes a voltage controlled oscillator indicated at 12 having input terminals 13 and 14 connected across a current-measuring resistor 15. The latter is connected in series with the transducer, so that the voltage Vs input to the VCO is $iR_s$. The converter means may also be considered to include the light emitting diode or LED 16 coupled with the VCO output terminals 17 and 18 to be switched on and off at VCO output frequency. Accordingly, the output of the LED is an on-off radiation beam generated by the LED, at an audio frequency which is linearly porportional to $V_s$ and therefore to the transducer output current $i$. The LED output is coupled, as at 19, to a suitable detector 30 referred to local equipment ground. Detector 30 may include a photosensitive element to count the on-off switchings of the beam 19 over a predetermined interval, to obtain a digital measure of the transducer output.

Also provided is circuitry coupled between the transducer output and the converter means to electrically energize the latter in response to current supplied by the transducer. Such circuitry, in FIG. 1, includes a shunt regulated power supply or voltage regulator 20 having its input side or terminal 21 connected in series with the resistor 15, and its output side coupled at 22 and 23 in power supply relation with the converter means, as for example the VCO 12. The regulator 20 maintains a fixed reference voltage $V_r$ between the connections or output terminals 22 or 23, for all expected values of input current $i$.

Both the VCO 12 and the LED 16, in addition to the shunt regulator 20, may be energized exclusively by the transducer current $i$; and the entire assembly may readily be arranged to withstand common-mode voltages in excess of 1,000 volts, and also to provide isolation impedances above $10^9$ ohms from 0 to 100 Hz.

Figure 2:
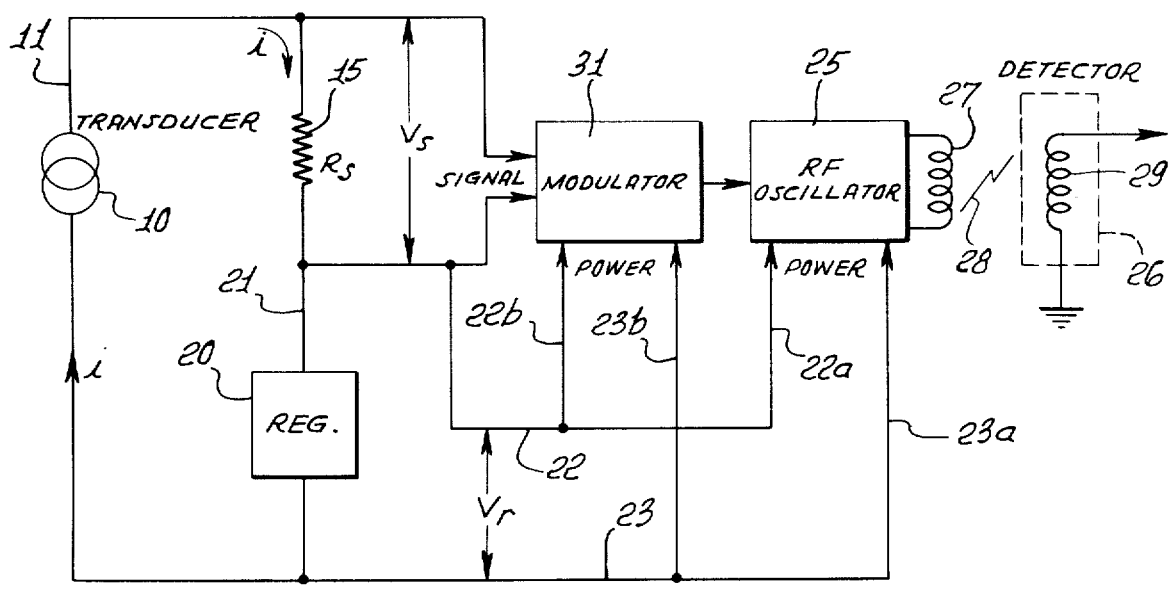

FIG. 2 is somewhat similar to FIG. 1, with corresponding components having the same numbers; however, the converter means comprises an r.f. oscillator 25 whose output is coupled to detector 26, and a modulator 31 responsive to the source output and coupled with the oscillator 25 to control the output frequency of the oscillator as a linear function of variations in the source output current $i$. For example, the oscillator may provide an output radio frequency signal at antenna 27, and which is frequency modulated relative to a reference frequency that is linearly proportional to $V_s$ and also $i$. The antenna or coil 27 is coupled by r.f. link 28 to antenna or coil 29 of the ground referred detector 26, wherein the r.f. may be treated either as an analog or digital representation of the transducer current. As before, the converter elements 25 and 26 are energized exclusively by the source current $i$, via the regulator 20 whose output connections are connected at 22a and 23a with oscillator, and at 22b and 23b with the modulator.

FIG. 3 illustrates in greater detail the FIG. 1 form of the invention, and arranged for operation at $i$ current levels from somewhat below 4 milliamps up to and above 20 milliamps. In this regard, modern current output transducers operate correctly for load voltages from zero to at least 10 volts, and to provide current output signals which vary over a 5 to 1 range. Standard ranges are 1–5 milliamps, 4–20 milliamps, and 10–50 milliamps, the invention having application at any of these ranges in view of the significant output power availability.

Corresponding elements and connection in FIG. 1 and 3 bear the same numerals. The shunt regulator 20, which provides both stabilized DC power to the remaining active elements and the necessary precision reference voltage for proper operation of the overall converter, is set up for a terminal voltage of 5.00 VDC. The input signal current is converted to proportional and equal signal voltages $V_s$ by the two resistors $R_r$, each of 25Ω. The overall input voltage burden on the transducer current source is therefore limited to 6.00 VDC at 20mA input current.

The integrator configuration of the DC amplifier $A_1$ is arranged to produce a linear output voltage with time, the amplitude of which is proportional to $V_s$ and the polarity of which is defined by the state of the solid-state analog switches $S_1$ and $S_2$ which are alternately open and closed.

Amplifier $A_2$ is arranged as a precision comparator, the output of which switches between two values near the two power supply levels as the integrator output voltage exceeds upper and lower bounds determined by resistors $R_1$, $R_2$ and $R_3$, together with the third analog switch $S_3$. As $A_2$ output changes state it provides current to the output light-emitting diode, LED, and also changes the state of all three analog switches.

The network containing $A_1$ and $A_2$ is thus arranged to behave as a precision voltage controlled oscillator driving the LED. The ground referred infra-red detector 30 senses the LED optical output and couples the oscillator frequency to an external counter 50 which is gated by a suitable crystal oscillator to obtain a precision digital measure of the initial current input.

The dynamic performances of the integrator and comparator are limited by the low operating power available. In this embodiment, the output operating frequency range used is 20Hz to 100Hz, and the frequency measurement is made over a period of 10 seconds. Since most transducers used in process control applications have useful signal bandwidths below 0.1Hz, this limited dynamic performance provides a subsidiary advantage in that the VCO integrator, followed by the 10 second counting interval, provides extremely effective filtering of spurious electrical or other noise components superimposed on the low frequency signal to be measured.

The entire converter network may readily be suitably shielded, with the shield referred to the transducer ground, to obtain a coupling impedance between the transducer signal and the output detector as low as 1pf. The assembly construction can be arranged to permit transient common-mode voltages up to arbitrarily high voltages by suitable physical spacings.

I claim:
1. In convertor apparatus,
 a. current generating transducer means to produce an analog output current,
 b. Converter means responsive to said transducer means output current to produce an oscillatory output signal which varies as a linear function of said transducer means output current,
 c. a current measuring resistor,
 d. A voltage regulator,
 e. a series circuit of said transducer means, said resistor, and said voltage regulator,
 f. said converter means having its input coupled to said resistor to be controlled by said analog output current,
 g. said voltage regulator energizing said converter means, and
 h. sensing means responsive to said output signal for yielding an analog output corresponding to said transducer means input.
2. The apparatus of claim 1 wherein the converter means comprises a voltage controlled oscillator responsive to said output current.
3. The apparatus of claim 2 wherein the converter means energizes a light emitting diode with light sensor means responsive to the output of the light emitting diode to produce electrical pulses, and a pulse counter connected to said light sensor.
4. The apparatus of claim 1 wherein the converter means comprises an r.f. oscillator whose output is coupled to said sensing means and modulator means responsive to said output current coupled to the oscillator to control the output frequency of the oscillator as a linear function of variations in the source output.

* * * * *